United States Patent [19]
Orozco et al.

[11] 3,711,108
[45] Jan. 16, 1973

[54] DEVICE FOR STEERING A VEHICLE OVER A FLUID OR SEMI-FLUID SURFACE

[75] Inventors: Enrique H. Orozco, 670 Irving Park, Chicago, Ill. 60613; Brian L. Asimor, 2909 Vinan Drive, Melrose Park, Ill. 60164; Edward C. Sylvester, Elmhust, Ill.

[73] Assignee: said Orozco and Asimor, by said Sylvester

[22] Filed: April 15, 1971

[21] Appl. No.: 134,274

[52] U.S. Cl. ................... 280/21 R, 180/5 R, 280/28
[51] Int. Cl. ............................................. B62b 17/02
[58] Field of Search ....... 180/3 R, 4 R, 5 R, 5 A, 6 R, 180/6 A; 280/12, 12 B, 16, 18, 19, 21, 28, 28.5, 29; 115/1, 70; 114/39; 9/1, 310; D14/24; D34/26.1

[56] References Cited

UNITED STATES PATENTS

| | | | |
|---|---|---|---|
| 2,220,634 | 11/1940 | Anderson | D34/26.1 UX |
| 3,319,971 | 5/1967 | Thomas et al. | 280/28 X |
| 302,762 | 7/1884 | Morrell | 280/28 |
| 2,829,902 | 4/1958 | Stocker | 280/18 |
| 506,080 | 10/1893 | Schafer | 280/21 R X |
| 620,166 | 2/1899 | McAnelly et al. | 180/6 R |
| 944,848 | 12/1909 | Doughty | 280/16 |
| 3,011,576 | 12/1961 | Howes | 180/5 R |
| 3,045,264 | 7/1962 | Smith | 9/1 A UX |
| 206,812 | 1/1967 | Keller | D34/26.1 |

Primary Examiner—Leo Friaglia
Assistant Examiner—Robert R. Song
Attorney—Thomas R. Vigil

[57] ABSTRACT

The steering device has a generally planar bottom side with a plurality of alternating, and parallel spaced ridges and grooves which are adapted to engage a fluid or semi-fluid surface such as snow when the vehicle is moving over the surface so that controlled, positive steering of the vehicle can be quickly and simply obtained merely by rotating the steering device.

8 Claims, 8 Drawing Figures

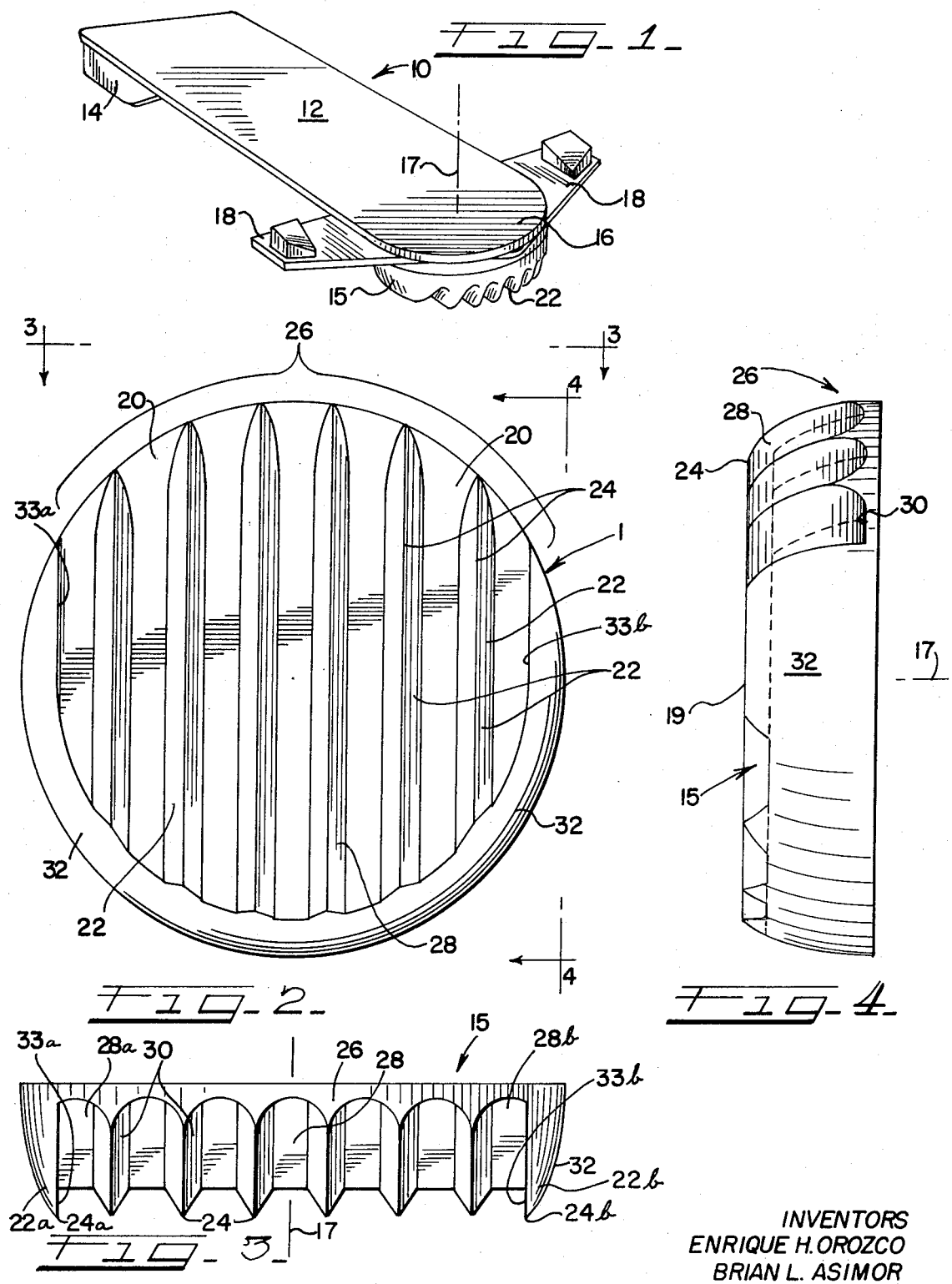

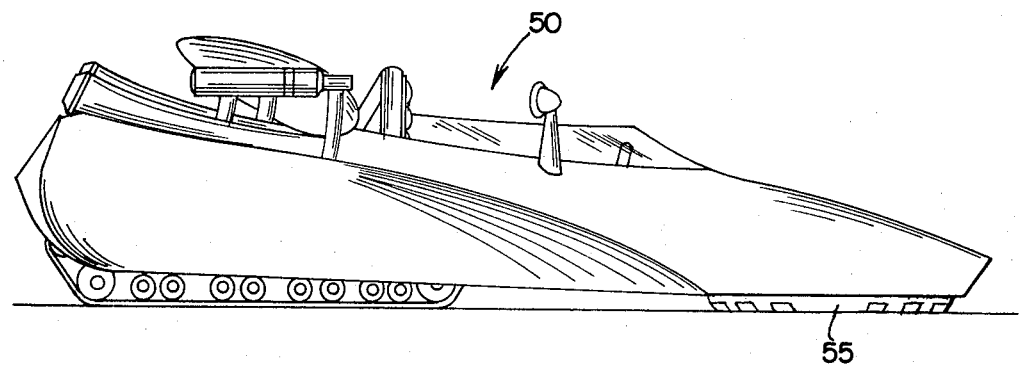
FIG. 5.
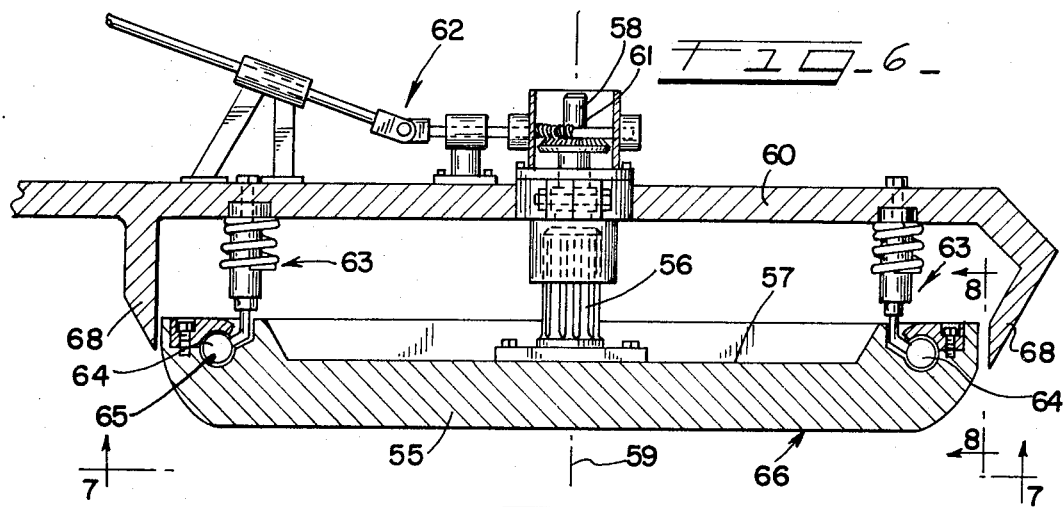
FIG. 6.
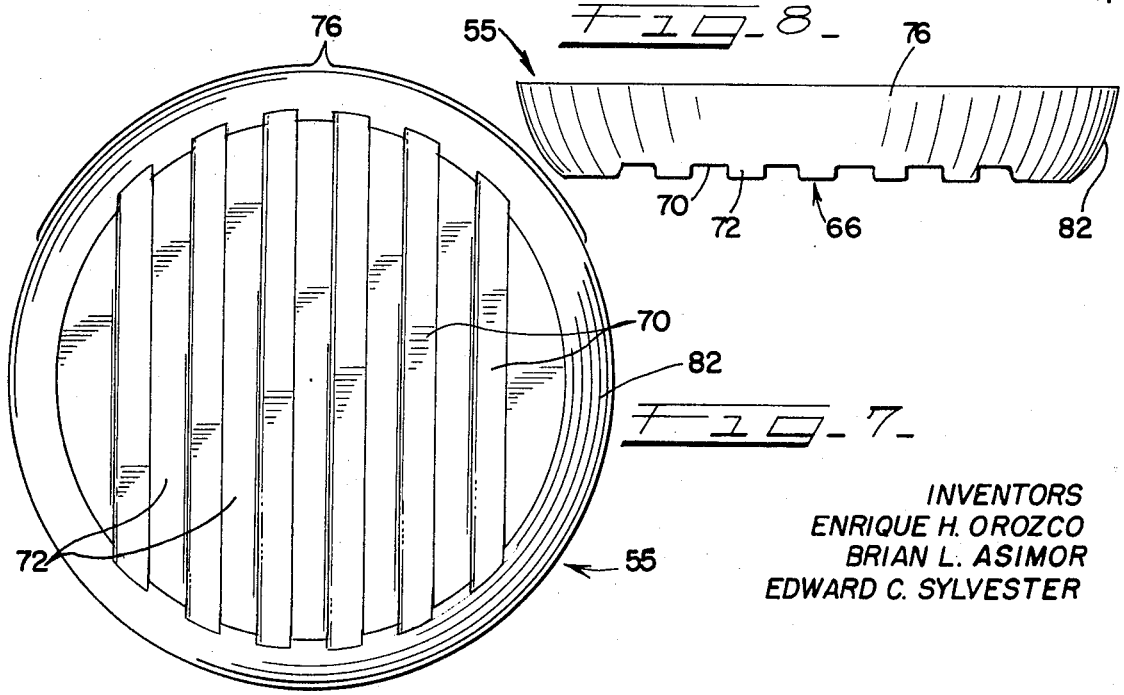
FIG. 8.
FIG. 7.
INVENTORS
ENRIQUE H. OROZCO
BRIAN L. ASIMOR
EDWARD C. SYLVESTER

DEVICE FOR STEERING A VEHICLE OVER A FLUID OR SEMI-FLUID SURFACE

This invention relates to a device for steering a vehicle over a fluid or semi-fluid surface. More specifically, the present invention relates to a steering device having a bottom side with a plurality of parallel spaced grooves formed therein. The grooves define therebetween spaced ridges and the ridges and grooves are adapted to engage a fluid or semi-fluid surface so that controlled, positive steering of a body or vehicle rotatably mounting the device can be quickly and simply obtained upon rotation of the steering device as it travels over the fluid or semi-fluid surface.

An important application of the steering device of the present invention is in the field of vehicles which travel over snow such as sleds, toboggans and snowmobiles. It is to be understood however, that the principles and teachings of the present invention may be utilized for steering vehicles over other fluid or semi-fluid surfaces such as, for example, sand, water and marshy areas.

In recent years, there has been an increased participation in winter sports utilizing vehicles such as toboggans, sleds and snowmobiles, particularly the latter. As the use of such vehicles adapted to travel over snow has increased, there has also been an increased desire and need for greater maneuverability of such vehicles. In this respect, a significant shortcoming or disadvantage of the presently known vehicles adapted to travel over snow is their limited turning ability. In this respect, steering of a toboggan or sled is most often accomplished by shifting the weight on the toboggan or sled to one side thereof. Stated another way, the degree of turning which can be obtained with most toboggans and sleds is limited since, in effect, they can only be caused to veer or swerve to one side. This shortcoming also exists in many sleds where steering is effected by twisting, bending or urging of the curved front end portions of the runners of the sled laterally to one side of the sled. Only very limited turning can be obtained in this way and only about a turning arc having a substantial radius.

To overcome this shortcoming in the steering of sleds, it has been proposed to rotatably mount a pair of skis, runners or wheels at the front end of a sled and to provide means, such as a steering wheel, for rotating the axle or cross member mounting the skis, runners or wheels about an axis perpendicular to the cross member to effect steering of the sled. Examples of such prior known mechanisms for steering a sled are disclosed in U.S. Pat. No. 2,095,951 issued to R. Andrus on Oct. 19, 1937, U.S. Pat. No. 2,388,145 issued to J. W. Heagney on Oct. 30, 1945 and U.S. Pat. No. 2,520,779 issued to R. F. Pauly on Aug. 29, 1950. Although the mechanisms disclosed in the aforementioned patents provide for improved steering of a sled such steering of the sled is still somewhat limited since, depending upon the speed of the sled, sliding of the skis, runners or wheels while they are being turned may often times occur. In view of the low co-efficient of friction between the skis, runners or wheels and the snow over which the sled is travelling and in view of the limited surface to surface contact between the skis, runners or wheels and the snow such sliding of the skis is more often the rule than the exception.

The problem of a pair of rotatably mounted skis sliding while being turned frequently occurs in snowmobiles wherein the pair of skis is mounted for rotation at the front end of the snowmobile for being rotated about a generally vertical axis. Here there is a strong tendency of the skis to slide in a direction laterally of the skis while they are being turned to effect turning of the snowmobile. The faster the speed of the snowmobile, the greater the amount of slide. Accordingly, steering of a snowmobile in the conventional manner by rotating a pair of skis mounted at the front end of the snowmobile is slow and awkward and this is particularly so when the snowmobile is travelling at moderate to fast speeds. Consequently, it is difficult if at all possible to effect a quick change in course of a conventional snowmobile.

Another shortcoming encountered with many conventional snowmobiles is that the front and rear end portions of the skis will extend beyond the sides of the snowmobile when it is turning thereby increasing the forward profile of the snowmobile. This requires a path of greater width while turning than while on a straight run. Also the end portions of the skis projecting from the sides of the snowmobile create a hazard in that they could catch on or engage an obstacle such as a branch, rock or tree trunk with resulting damage to the snowmobile and/or injury to the driver thereof.

Consequently, it is desirable to provide a steering device for a snowmobile or a sled by which turning of the snowmobile or sled can be quickly and positively effected, particularly at moderate to fast speeds of the sled or snowmobile.

Heretofore, a steering device adapted to be rotatably mounted on a sled or snowmobile and having a bottom snow-engaging side with a plurality of parallel spaced grooves formed therein so that ridges defined between the grooves can bite or cut into the snow to provide for controlled positive turning of the sled or snowmobile upon rotation of the steering device while the sled or snowmobile is travelling over snow has not been proposed, although it has been proposed to increase the traction of a non-rotatable elongated runner on a ski sled by providing three parallel grooves in the bottom surface of the runner. Such a runner is disclosed in U.S. Pat. No. 3,451,689 issued to A. P. Owens on June 24, 1969.

In view of the above noted shortcomings of conventional sleds, snowmobiles and other vehicles adapted to travel over a fluid or semi-fluid surface and in view of the desirability and need for improved maneuverability and steering of vehicles which travel over a fluid or semi-fluid surface, it is a primary object of the present invention to provide a steering device by which positive controlled steering of a vehicle over the fluid or semi-fluid surface can be quickly and simply effected merely by rotating the device.

Another object of the present invention is to provide a steering device of the type described in the preceding paragraph and in which the bottom side of the steering device cuts or bites into the surface to provide for positive engagement of the steering device with the surface so that quick, positive and effective turning of the vehicle is obtained upon rotation of the steering device.

Another object of the present invention is to provide a steering device of the type described in the preceding paragraphs and in which sliding of the steering device in a direction other than the desired direction of movement of the vehicle is minimized if not altogether eliminated.

Another object of the present invention is to provide a steering device of the type described in the preceding paragraphs and in which no portion of the device will extend beyond the sides of the vehicle when the steering device is rotated to change the direction of travel of the vehicle.

Another object of the present invention is to provide a steering device of the type described in the preceding paragraphs and in which the bottom side of the device has a plurality of parallel spaced grooves therein.

Another object of the present invention is to provide a steering device as described in the preceding paragraph and in which a plurality of parallel spaced ridges, ribs or fins are defined between the grooves in the bottom side of the device.

Another object of the present invention is to provide a steering device of the type described in the preceding paragraph and in which the crest of the ridges, ribs or fins are relatively sharp.

Another object of the present invention is to provide a steering device of the type described in any one of the last three paragraphs and in which the grooves formed in the bottom side of the device extend from the bottom side a predetermined distance into the front side of the device.

Another object of the present invention is to provide a steering device of the type described in the preceding paragraphs and in which the bottom side of the device has a generally compact areal extent.

Another object of the present invention is to provide a steering device of the type described in the preceding paragraphs and in which the bottom side of the device has a generally circular extent.

Still another object of the present invention is to provide a steering disk having a plurality of alternating and parallel spaced ridges and grooves formed on the bottom side thereof for engaging a fluid or semi-fluid surface during movement of the disk over the surface to facilitate a quick, positive and controlled change in direction of movement of the steering disk over the surface upon rotation of the disk.

For a more complete understanding of the nature and scope of the present invention, reference may now be had to the following detailed description of the preferred embodiments of the invention taken in conjunction with the accompanying drawings wherein:

FIG. 1 is a perspective view of a sled utilizing one embodiment of the steering device of the present invention;

FIG. 2 is a bottom plan view of the steering device shown in FIG. 1;

FIG. 3 is a front elevational view of the steering device shown in FIGS. 1 and 2 taken along line 3—3 of FIG. 2;

FIG. 4 is a side view of the steering device shown in FIG. 2 taken along line 4—4 of FIG. 2;

FIG. 5 is a side elevational view of a snowmobile utilizing another embodiment of the steering device of the present invention;

FIG. 6 is an enlarged sectional view of the steering device shown in FIG. 6 and shows the mounting of the device to the front underside of the snowmobile shown in FIG. 6;

FIG. 7 is a bottom plan view of the steering device shown in FIG. 6 taken along line 7—7 of FIG. 6; and, FIG. 8 is a front elevational view of the steering disk shown in FIG. 6 taken along line 8—8 of FIG. 6.

Referring now to the drawings in greater detail, a sled is generally indicated at 10 in FIG. 1. The sled 10 includes a body portion 12 in the form of a generally rectangular plank. Two runners 14 are fixed to the rear underside of the plank 12 and a steering device 15 made in accordance with the teachings of the present invention is rotatably mounted in a suitable manner at, to and beneath the front end 16 of the plank 12 for rotation about a central axis 17 of the device 15. Steering arms 18 extend from opposite sides of the front end 16 of the plank 12 and are secured to the steering device 15 for rotating the same. In the embodiment of the invention shown in FIGS. 1–4 the steering device 15 is a generally flat circular member. Stated another way, the steering device 15 is in the form of a disk.

In accordance with the teachings of the present invention, the steering disk 15 has a bottom side 19 on or in which is formed parallel spaced grooves 20 which extend across the bottom side 19 of the disk 15 as best shown in FIG. 2. The grooves 20 define therebetween a plurality of ridges, ribs or fins 22. Preferably, to facilitate biting or cutting of the ridges 22 into a fluid or semi-fluid surface such as snow the ridges 22 have a tapered or beveled cross section so that the crest 24 of each of the ridges 22 is generally sharp.

Also, to facilitate and enhance engagement of the ridges 22 in, and travel of the ridges 22 through the snow, the ridges 22 and the grooves 20 have portions thereof which extend a predetermined distance into a front side 26 of the steering disk 15 as best shown in FIGS. 3 and 4. The portion of each groove 20 extending into the front side 26 is indicated at 28 and the portion of each of the ridges 22 extending into the front side 26 of the disk 15 is indicated at 30. As shown, the portions 28 and 30 of the grooves and ridges 20 and 22 in the front side 26 of the disk 15 curve upwardly from the bottom side 19 of the disk 15 to provide for a smooth entry of the ridges 22 into the snow and to provide for smooth engagement of the grooves 20 and ridges 22 with the snow.

In addition to being generally circular, the steering disk 15 has a substantially continuous side surface 32 which curves downwardly toward the bottom side 19 and inwardly toward the axis 17 of rotation of the disk 16 to facilitate rotational movement of the disk 17 in the snow and particularly while it is travelling over and partially in the snow. Also, a portion of the side surface 32 extends to side portions 33a and 33b of the grooves 28a and 28b furthest from the axis 17 so as to form sharp edges 24a and 24b on the side ridges 22a and 22b on the bottom side 19 of the disk 15.

Referring now to FIGS. 5–8, a snowmobile is generally indicated at 50 in FIG. 5 and has mounted on the front underside thereof another form of steering device of the present invention, generally indicated at 55.

As best shown in FIG. 6 the steering device 55 has an arbor 56 secured to the top side 57 of the device 55 and centrally thereof. A shaft 58 is connected to the arbor 56 such as by a slidable spline connection for rotating the device 55 about a central axis 59 thereof. The shaft 58 is rotatably journaled to a frame member 60 of the snowmobile 50 and is rotated by means of a gear mechanism 61 driven by a steering linkage generally indicated at 62. Preferably, two (or four) guide bearing and shock absorbing assemblies 63 are mounted to the underside of the frame member 60 and each includes a ball 64 which is received in a circular groove 65 formed in the top side 57 of the steering device 55. As shown in FIG. 6 one assembly 63 is mounted adjacent the front end of the device 55 and another assembly 63 is mounted adjacent the rear end of the device 55. The shock absorbing assemblies 63 minimize, if not altogether prevent, the application of bending forces on the shaft 58 as a result of forces being applied to the front and/or rear end of the steering device 55 during travel of same over rugged terrain.

Preferably, the frame member 60 has a depending skirt portion 68 which extends downwardly to a point adjacent the device 55 and around the device 55 to inhibit if not altogether prevent foreign matter from entering into the area between the frame member 60 and the top side 57 of the steering device 55.

As best shown in FIG. 7, the steering device 55 is disk shaped and is very similar to the steering disk 15. In this respect, the bottom side 66 of the disk 55 is provided with a plurality of parallel spaced grooves 70 which define therebetween a plurality of ridges 72. However, the crest 74 of each of the ridges 72 is blunt, as opposed to the generally sharp crest 24 of each of the ridges 22. The disk 55 has a front or leading side 76 and as best shown in FIGS. 7 and 8, the grooves 70 and ridges 72 do not extend upwardly into the front side 76 of the disk 55 as do the grooves 20 and ridges 22 in the disk 15.

The disk 55 has a side surface 82 similar to the side surface 32 on the disk 15. In this respect, the side surface 82 is substantially continuous and curves downwardly from the top side 57 to the bottom side 66 of the disk 55 and inwardly of the disk 55 toward the central axis 59 thereof as best shown in FIGS. 7 and 8.

It will be understood that the cross section of the grooves 70 and ridges 72 of the disk 55 can be altered as desired and need not have the shape or design shown in FIGS. 7 and 8. In this respect, the form, shape or design of the grooves and ridges 20 and 22 shown in FIGS. 2, 3 and 4 is preferred, since this design better enables the disk to bite or cut into snow and thereby better provide the desired interaction between the disk and the snow for obtaining positive and controlled steering with the steering disk 15 or 55.

Although the steering devices 15 and 55 of the present invention have been illustrated as being in the form of a disk, it is to be understood that the steering device of the present invention can take other shapes. For example, the steering devices 15 or 55 could be oval or square with rounded corners. Also it is to be understood that a steering device having the general form of the disk 55 can be utilized on the sled 10 and that a steering device having the general form of the steering disk 15 can be utilized on the snowmobile 50.

Thus, it will be apparent to those skilled in the art that other modifications and variations can be made to the illustrated embodiments of the present invention without departing from the spirit and scope of the invention.

Also, it will be apparent from the foregoing description, that the present invention has numerous advantages some of which have been set forth above and others of which are inherent in the invention. Accordingly, the scope of the present invention is only to be limited as necessitated by the accompanying claims.

We claim:

1. A device for steering a vehicle over a fluid or semifluid surface, said device having a substantially circular shape including a substantially continuous side surface which curves around said device and which curves downwardly and inwardly toward the underside of said device, having a generally vertical axis of rotation substantially at its geometric center, and having a plurality of alternating and parallel spaced ridges and grooves formed in and extending essentially throughout the areal extent of and extending substantially across said underside, each of said ridges extending at one end thereof upwardly from said underside into the forward facing portion of said substantially continuous side surface, the crest of each of said ridges being generally sharp.

2. In a vehicle, such as a sled or snowmobile, which is of the type including an elongate body, means on said elongate body for contacting a fluidlike surface, and a steering mechanism mounted on one end of said elongate body for rotation about a generally vertical axis, said steering mechanism including a generally vertically disposed shaft rotatably journalled to said one end of said elongate body and a steering device connected to said shaft and adapted to contact the fluidlike surface, the improvement comprising said steering device being a generally circular body fixed at its geometric center to said shaft and having a substantially continuous side surface such that during rotation of said device during movement of said vehicle over the fluidlike surface said device presents substantially the same profile to the direction of movement of the vehicle, said device having a bottom side adapted to contact the fluidlike surface, and said device having a plurality of alternating and parallel spaced ridges and grooves formed in, and essentially throughout the areal extent of said bottom side, said ridges and grooves extending substantially across said bottom side with said grooves opening onto said continuous side surface thereby to engage and to bite into the fluidlike surface during movement of said vehicle over the fluidlike surface whereby positive and controlled steering of said vehicle can be simply and quickly effected by rotating said steering device about said generally vertical axis.

3. The steering device according to claim 2 being circular.

4. The steering device according to claim 2 having a bowl-like shape.

5. The steering device according to claim 2 wherein the crest of each of said ridges is generally blunt.

6. The steering device according to claim 2 wherein the crest of each of said ridges is generally sharp.

7. The steering device according to claim 2 wherein said generally circular body has a front side and said grooves and ridges extend a predetermined distance from said bottom side of said generally circular body into said front side of said generally circular body.

8. The steering device according to claim 2 wherein said generally circular body has a substantially continuous side surface which curves downwardly toward said bottom side and inwardly toward said generally vertical axis.

* * * * *